(12) United States Patent
Anderson et al.

(10) Patent No.: US 8,231,341 B2
(45) Date of Patent: Jul. 31, 2012

(54) HYBRID COMPRESSOR

(75) Inventors: Stephen A. Anderson, St. Sauveur (CA); Ronald Trumper, St. Bruno (CA); Gary Weir, Markham (CA)

(73) Assignee: Pratt & Whitney Canada Corp., Longueuil (CA)

( * ) Notice: Subject to any disclaimer, the term of this patent is extended or adjusted under 35 U.S.C. 154(b) by 651 days.

(21) Appl. No.: 12/404,573

(22) Filed: Mar. 16, 2009

(65) Prior Publication Data
US 2010/0232953 A1 Sep. 16, 2010

(51) Int. Cl.
*F04D 29/02* (2006.01)
(52) U.S. Cl. .......... 415/191; 415/199.5; 415/199.4; 415/208.2; 415/211.2; 415/181
(58) Field of Classification Search .......... 415/191, 415/199.4, 224.5, 144, 145
See application file for complete search history.

(56) References Cited

U.S. PATENT DOCUMENTS

| | | | |
|---|---|---|---|
| 1,488,582 A | 4/1924 | Allen | |
| 2,318,990 A | 5/1943 | Doran | |
| 2,350,839 A | 6/1944 | Szydlowski | |
| 2,434,678 A | 1/1948 | Szczeniowski | |
| 2,566,550 A | 9/1951 | Birmann | |
| 2,671,604 A | 3/1954 | Hagen | |
| 2,797,858 A | 7/1957 | von der Nuell | |
| 2,840,299 A | 6/1958 | Paetz | |
| 2,982,986 A | 5/1961 | Tupper | |
| 2,991,982 A | 7/1961 | Johnson | |
| 3,040,971 A | 6/1962 | Pavlecka | |
| 3,291,236 A | 12/1966 | Foshag et al. | |
| 3,314,647 A | 4/1967 | Pavlecka | |
| 3,447,740 A | 6/1969 | Fabri et al. | |
| 3,930,746 A | 1/1976 | Kronogard | |
| 3,936,240 A | 2/1976 | Dochterman | |
| 3,941,499 A | 3/1976 | Kronogard | |
| 3,972,644 A | 8/1976 | Johnson | |
| 4,030,288 A | 6/1977 | Davis et al. | |
| 4,428,715 A | 1/1984 | Wiggins | |
| 4,459,803 A | 7/1984 | Marshall | |
| 4,661,042 A * | 4/1987 | Goloff | 415/64 |

(Continued)

FOREIGN PATENT DOCUMENTS

DE 1401438 10/1968
(Continued)

OTHER PUBLICATIONS

Moustapha et al., "4th CRIAQ Research Forum", Publication Pratt & Whitney Canada, Apr. 17, 2008.

(Continued)

*Primary Examiner* — Victor A Mandala
*Assistant Examiner* — Krista Soderholm
(74) *Attorney, Agent, or Firm* — Norton Rose Canada LLP

(57) ABSTRACT

A hybrid gas compressor has at least one rotor and shroud which define a compressor gas path extending from an inlet to an outlet. The compressor includes at least two compression stages and one diffusion stage between the inlet and outlet, the compression stages including respective circumferential arrays of blades extending from the rotor and the diffusion stage including a circumferential array of vanes between the compression stages. Blade aerodynamic loadings may be controlled, particularly in the last stage, to provide desired compression characteristics across the compressor. A bleed outlet is optionally located between the inlet and outlet for bleeding from the gas path.

20 Claims, 8 Drawing Sheets

U.S. PATENT DOCUMENTS

| | | | |
|---|---|---|---|
| 4,687,412 A | | 8/1987 | Chamberlain |
| 4,981,414 A | | 1/1991 | Sheets |
| 5,062,766 A | | 11/1991 | Miura et al. |
| 5,152,661 A | | 10/1992 | Sheets |
| 5,167,489 A | * | 12/1992 | Wadia et al. ............... 415/182.1 |
| 5,553,448 A | | 9/1996 | Farrell et al. |
| 6,193,473 B1 | | 2/2001 | Mruk et al. |
| 6,312,220 B1 | | 11/2001 | Horner |
| 6,488,469 B1 | | 12/2002 | Youssef et al. |
| 6,499,953 B1 | | 12/2002 | Bellerose et al. |
| 6,589,013 B2 | | 7/2003 | Abdallah |
| 6,616,421 B2 | | 9/2003 | Mruk et al. |
| 7,390,163 B2 | | 6/2008 | Clauson |

FOREIGN PATENT DOCUMENTS

| | | |
|---|---|---|
| EP | 0021709 | 1/1981 |
| EP | 0075506 | 3/1983 |
| EP | 0080251 | 6/1983 |
| EP | 1041287 | 10/2000 |
| EP | 1041289 | 10/2000 |
| EP | 1217219 | 6/2002 |
| FR | 908121 | 4/1946 |
| FR | 972751 | 2/1951 |
| FR | 2513325 | 3/1983 |
| GB | 2334756 | 9/1999 |
| WO | WO81/00139 | 1/1981 |
| WO | WO84/00049 | 1/1984 |
| WO | WO02/068826 A3 | 9/2002 |
| WO | WO20051033476 A1 | 4/2005 |

OTHER PUBLICATIONS

Roberts et al., "Numeral investigation of tandem-impeller designs for a gas turbine compressor", Proceedings of ASME Turbo Expo 2001, Jun. 4-7, 2001, pp. 1-12, New Orleans, Louisiana USA.

* cited by examiner

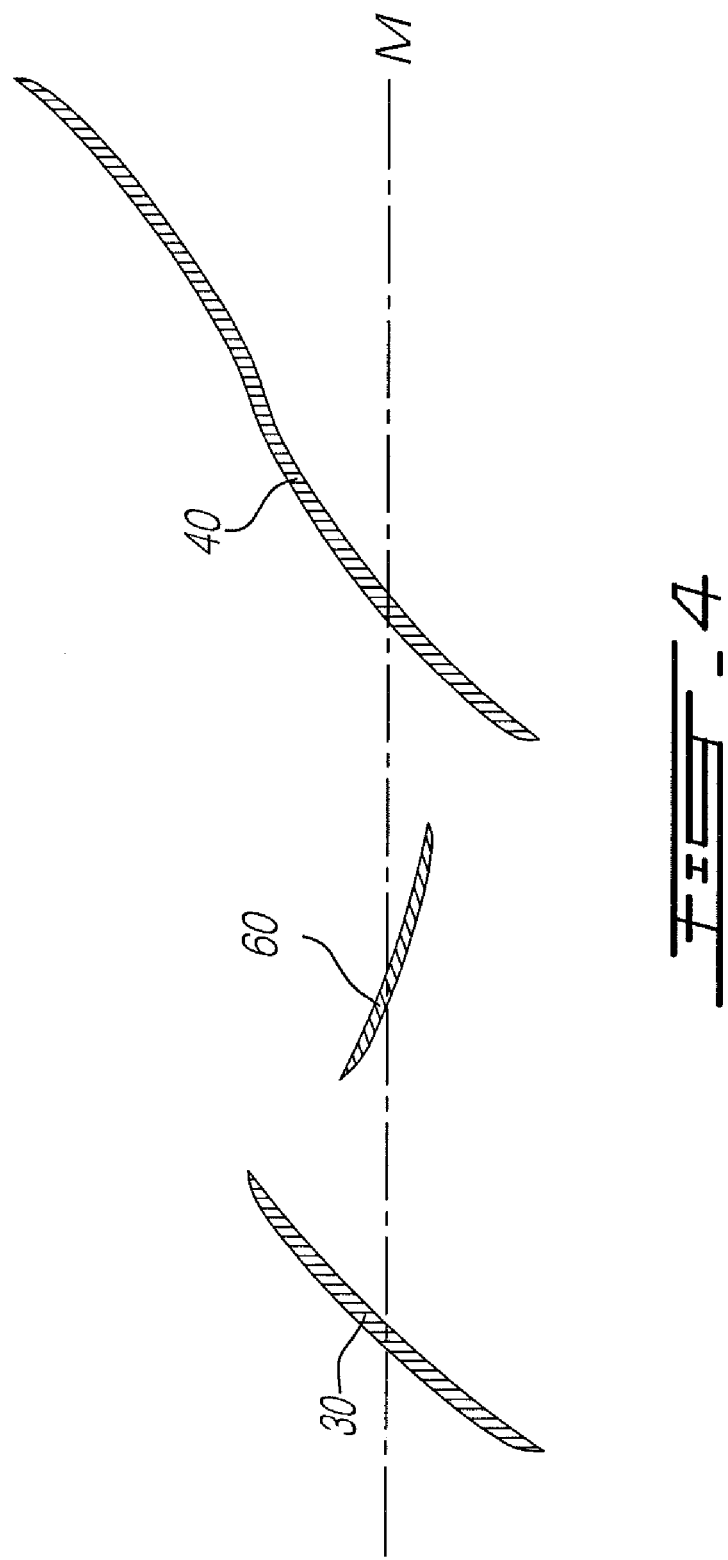

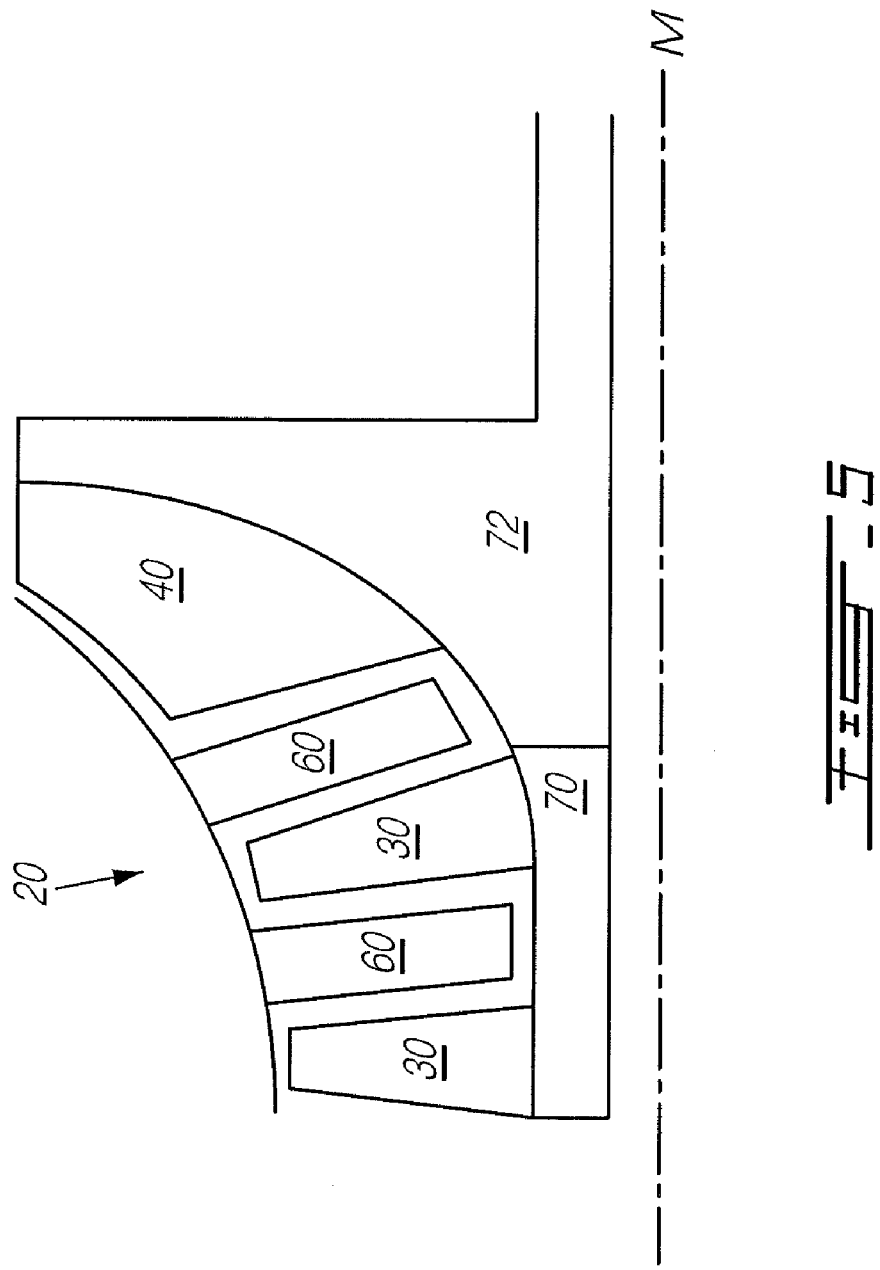

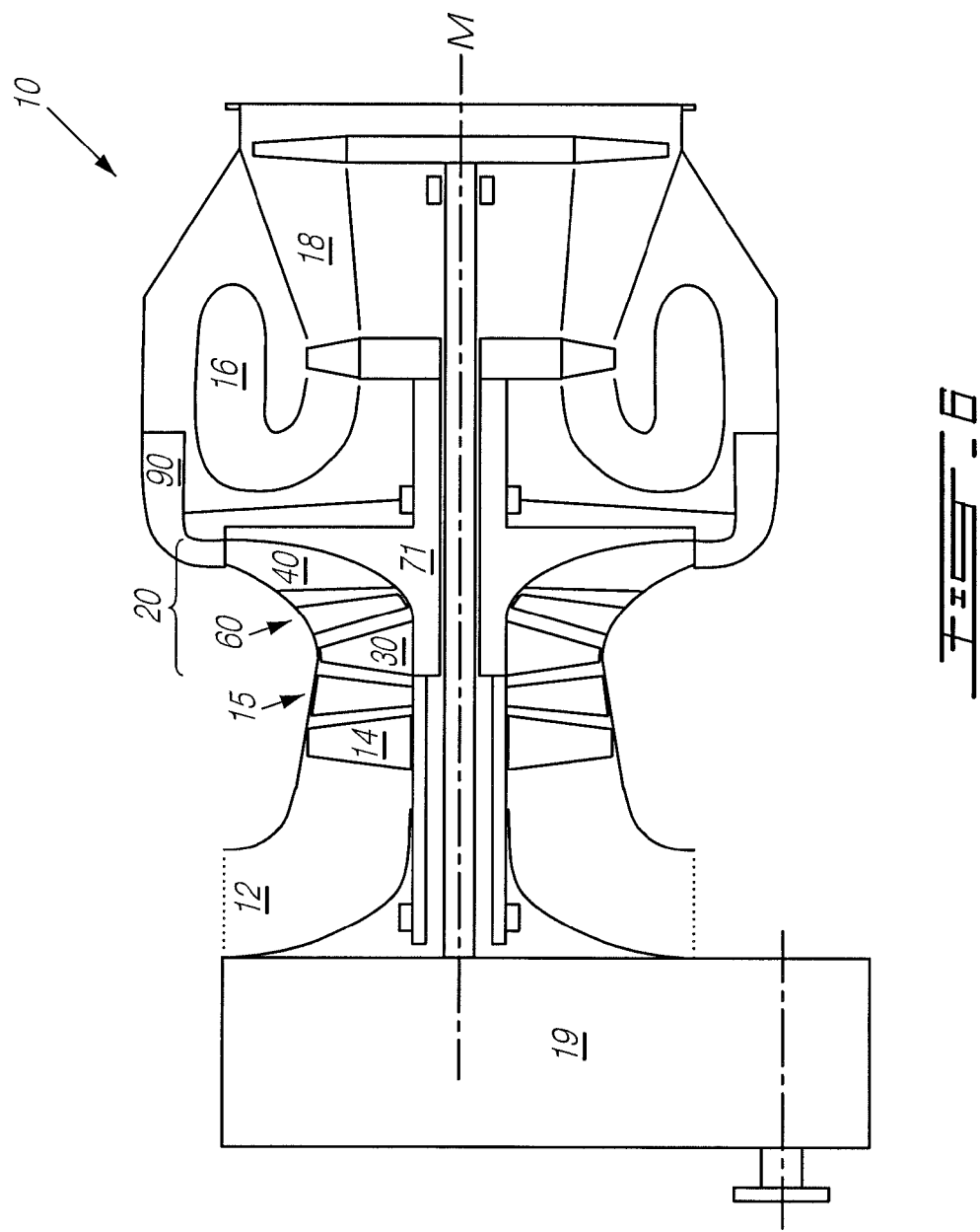

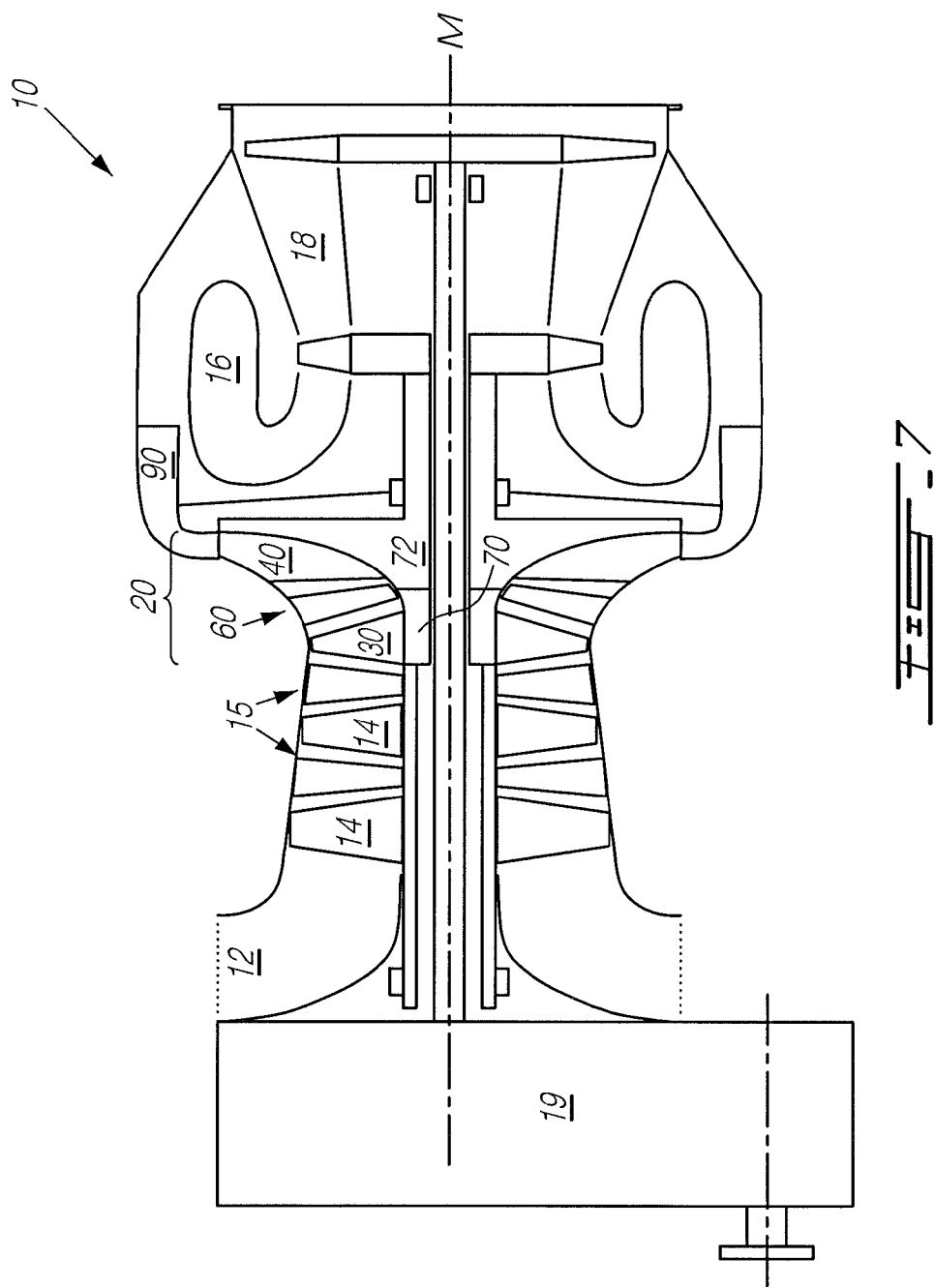

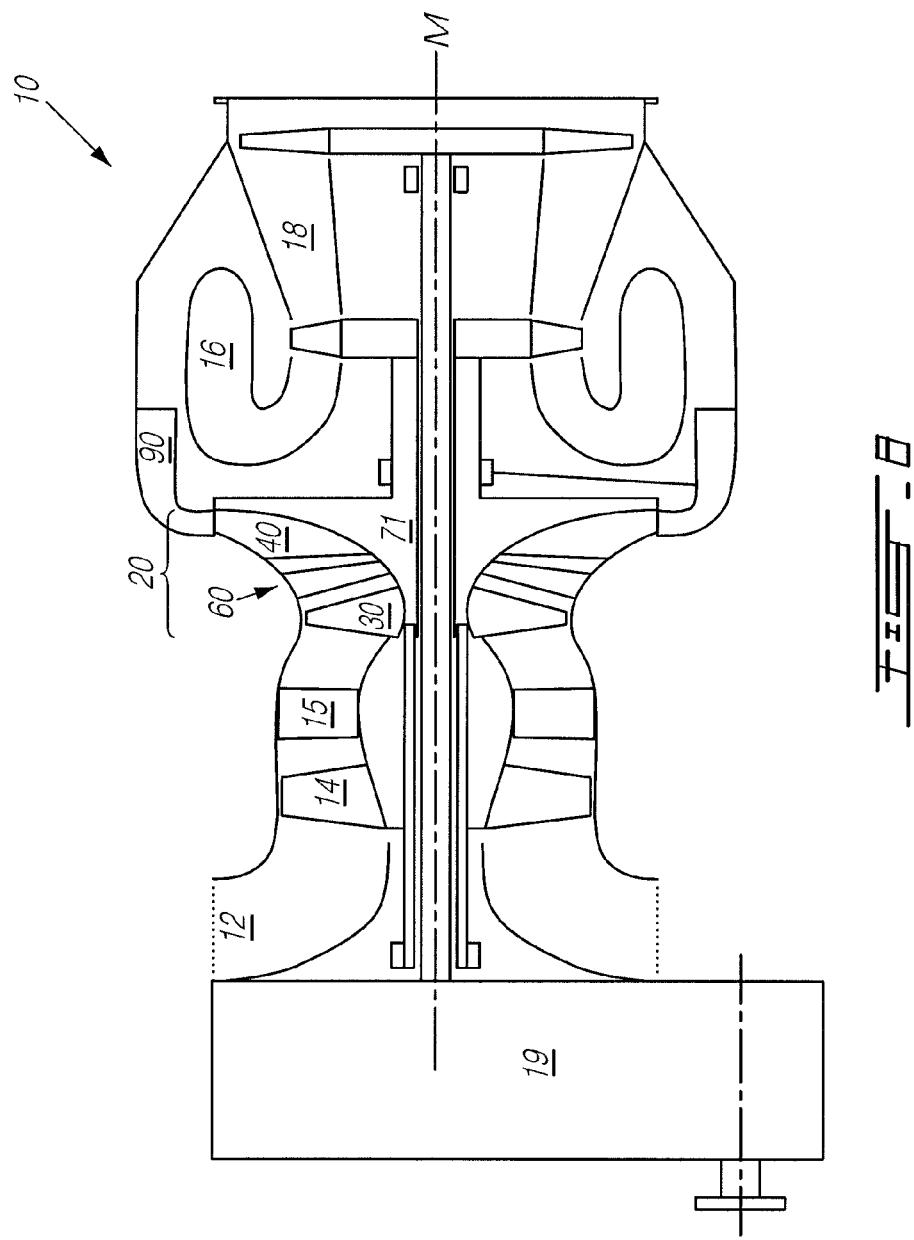

HYBRID COMPRESSOR

TECHNICAL FIELD

The technical field relates generally to air compressors and/or turbines, for example of the type employed in aero gas turbine engines and the like.

BACKGROUND

Centrifugal compressors achieve compression primarily through the increasing radius of their impellers. High compression can be achieved in a single compact stage, but since the velocities increase continuously through the impeller, supersonic velocities can be experienced at the exit of the impeller, which can increase the losses and decrease the efficiency of the compressor. Axial compressors, on the other hand, typically employ multiple stages of relatively lower compression to cumulatively achieve high compression. A stationary blade row, often referred to as stator vanes, after each rotary blade row reduces the velocity before entering the next rotor. Thus, although total compression increases with each stage, velocity does not increase at the same rate. The result is that multi-stage axial compressors are generally more efficient, for a given pressure ratio, than centrifugal compressors. The trade-off, however is that axial compressors tend to be longer and, in many cases, the compact size and low cost of a centrifugal compressor can outweigh the efficiency penalty, where weight/size are critical, such as in small gas turbine engines in prime mover applications. Nonetheless the trade-off is not always satisfactory, and the desire for better solutions remains.

Although, it has been generally recognized that high efficiency may be realized by providing a series of compression-diffusion stages along the flow path of constant or near constant diameter (i.e. in conventional axial compressors), prior art like U.S. Pat. Nos. 2,350,839 and 4,428,715, and French patent publication 972751A respectively teach employing multiple compression-diffusion stages along the flow path of increasing diameter. Both teach limiting the pressure ratio, radius change and or air speeds in each stage, such that a series of axial stages are provided in what otherwise looks like the envelope of a centrifugal compressor. However, these compressor are relatively complicated and heavy relative to the single stage centrifugal compressor. Such compressors would also tend to exhibit poor surge/stall characteristics if they incorporated into an aero gas turbine engine. Thus, there remains a need for improved efficiency, packaging, weight, cost, durability and/or operability, to name but a few, in compressor/turbine rotor design.

SUMMARY

In one aspect, there is provided a gas compressor comprising a rotor rotatable about a compressor axis and cooperating with an annular compressor shroud to define a gas path extending from an upstream compressor inlet to a downstream compressor outlet, the inlet substantially parallel with the compressor axis and the outlet being non-parallel with the compressor axis, the rotor having first and second compression stages, the first compression stage comprising a circumferential array of blades extending from a rotor hub towards the shroud, the second compression stage downstream of the first and comprising a circumferential array of centrifugal-like compressor vanes extending from the hub towards the shroud, each compression stage having a mean outlet radius greater than its mean inlet radius, the second compression stage having a pressure ratio exceeding 2:1, the compressor further comprising a diffusion stage interposed between said compressor stages, the diffusion stage comprising a circumferential array of vanes extending from the shroud toward the rotor hub, the diffusion stage vanes disposed between trailing edges of the first stage blades and leading edges of the second stage vanes, diffusion stage vanes inclined oppositely to the compression stages to decrease tangential velocity of gas exiting the first compression stage.

In a second aspect, there is provided a gas compressor comprising a single axial-like compression-diffusion stage followed by a single centrifugal-like compression stage, the compressor having an axial inlet and a substantially radial outlet, the axial-like compression-diffusion stage including an a circumferential array of axial-like blades extending from a rotatable rotor of the compressor immediately downstream of the inlet and extending towards a shroud, the array of axial-like blades having a pressure ratio not greater than 2:1, the axial-like compression-diffusion stage further including a circumferential array of diffusion vanes located downstream of trailing edges of the axial-like blades and extending from the shroud toward the rotor, the centrifugal-like compression stage including a circumferential array of centrifugal-like compressor vanes extending from the rotor towards the shroud, the array of centrifugal-like compressor vanes having a pressure ratio exceeding 2:1, the array of centrifugal-like compressor vanes having trailing edges immediately upstream of the outlet and leading edges downstream of trailing edges of the diffusion vane, the diffusion vanes inclined oppositely to the axial-like blades to decrease tangential velocity of gas exiting the axial-like blade array.

In a third aspect, there is provided a gas turbine engine comprising a compressor having a rotor and shroud defining a compressor gas path extending from a substantially axial inlet to a substantially radial outlet, the compressor including at least two compression stages and one diffusion stage between the inlet and outlet, the compression stages comprising respective circumferential arrays of blades extending from the rotor, the compression stages arranged serially relative to one another between the inlet and outlet, the diffusion stage comprising a circumferential array of vanes located serially between said compression stages, the diffusion stage vanes extending from the shroud toward the rotor, the compressor having at least one bleed outlet located between the first and second compressor stages configured for bleeding from the gas path.

Further details of these and other aspects will be apparent from the detailed description and figures included below.

DESCRIPTION OF THE DRAWINGS

Reference is now made to the accompanying figures, in which:

FIG. 4 is a representative view taken along line IV-IV of FIGS. 2 and/or 3, illustrating the configurations and relative inclinations of successive stages; and FIG. 5 is a schematic cross-sectional view of the upper half of another example of the compressor of FIG. 1;

FIGS. 6-8 schematically show gas turbine engines incorporating a compressor according to other aspects of the present description.

DETAILED DESCRIPTION

Figure 1:
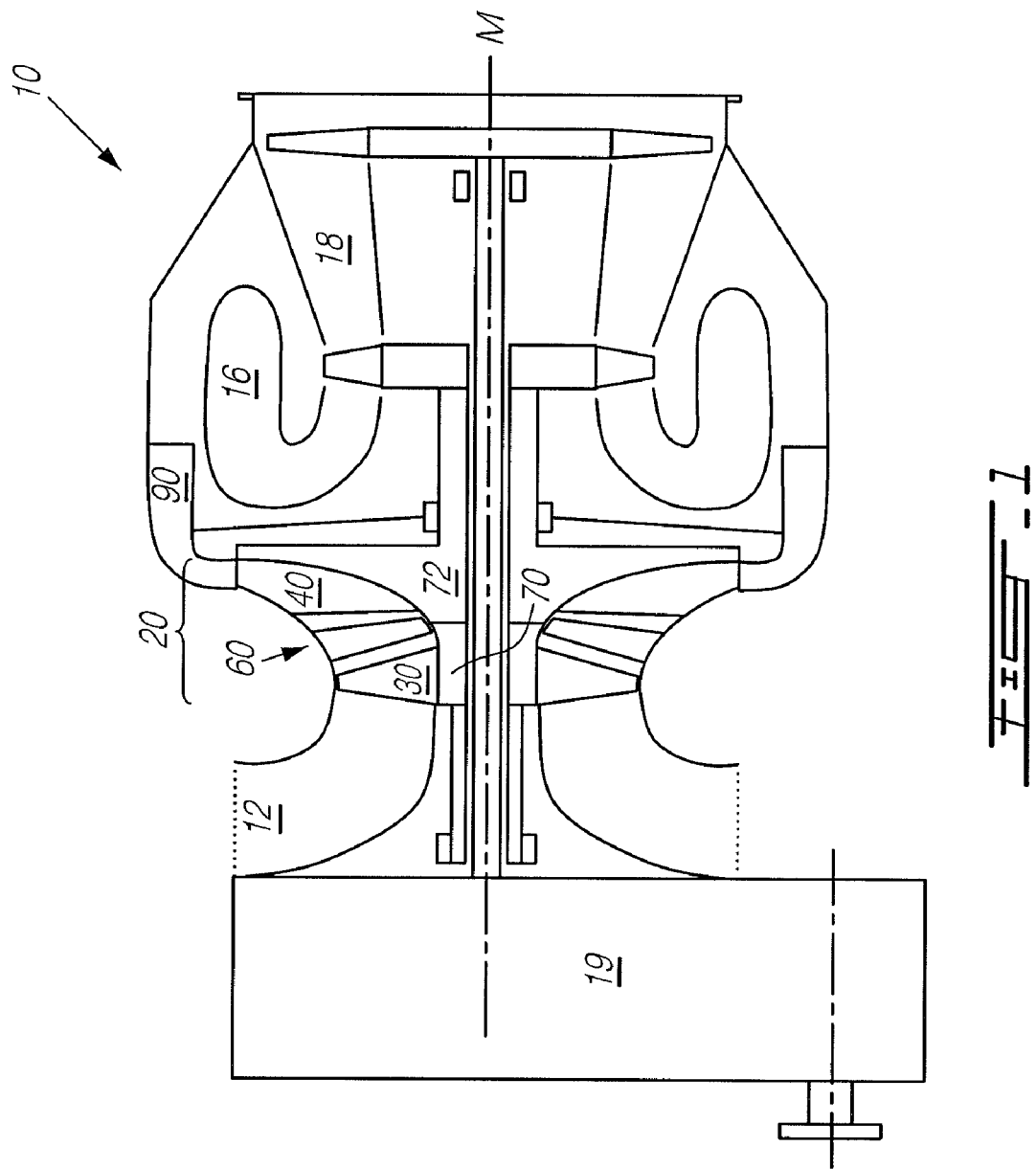
FIG. 1 schematically shows a gas turbine engine incorporating a compressor according to the present description.

FIG. 1 schematically illustrates a turboshaft gas turbine engine 10, generally comprising in serial flow communication an inlet 12 through which ambient air is drawn, a compressor 20 for pressurizing the air, a combustor 16 in which the compressed air is mixed with fuel and ignited for generating hot combustion gases, a turbine section 18 for extracting mechanical energy from the combustion gases, and a mechanical output, such as a reduction gearbox 19 in this example. The compressor 20 has an centrifugal "hybrid" design, as will now be further described.

Figure 2:
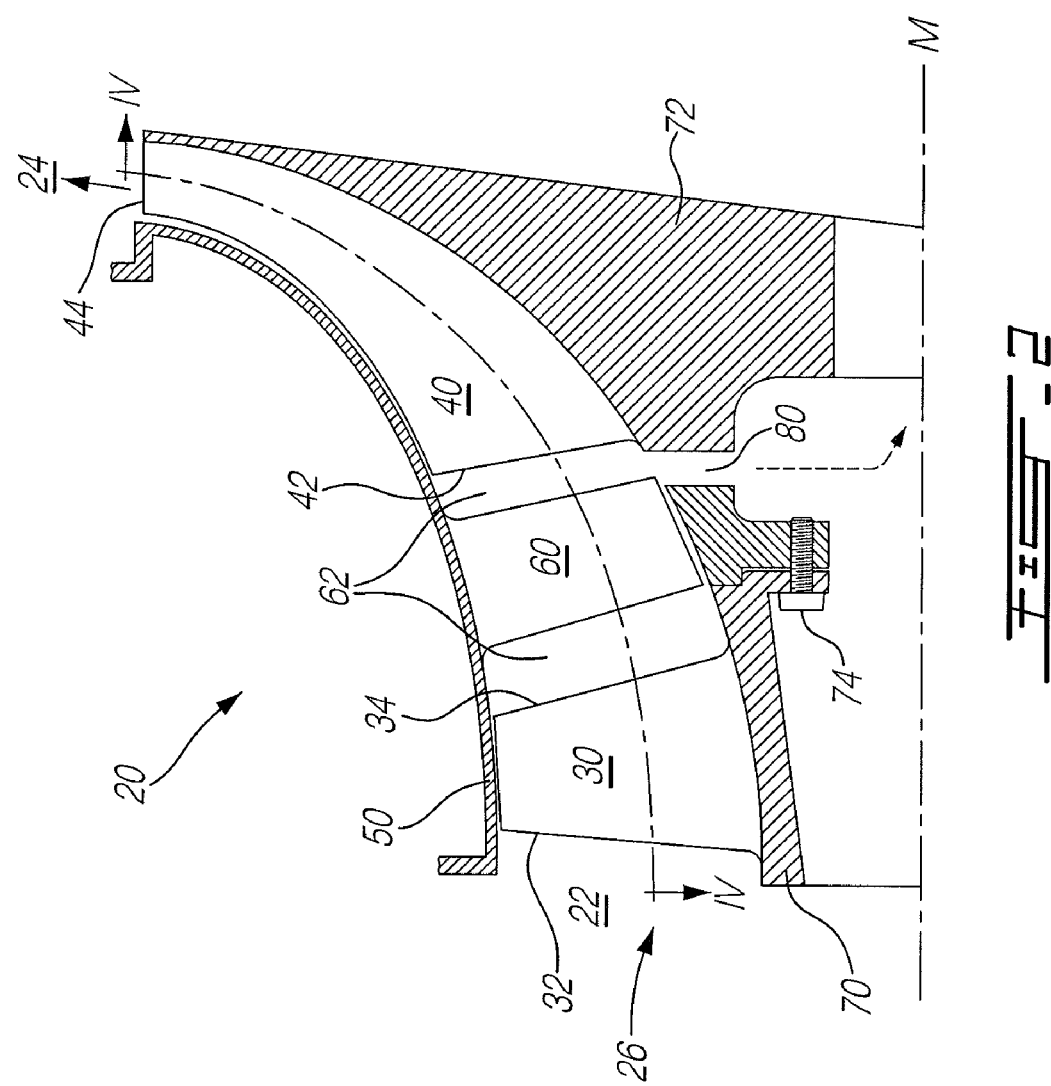
FIG. 2 is a schematic cross-sectional view of the upper half of the compressor of FIG. 1.

Referring now to FIG. 2, the "hybrid" compressor 20 has a generally axially-oriented inlet 22 (i.e. airflow generally parallel (0°) to axis M) and in this example a generally radial outlet 24 (i.e. airflow generally perpendicular (90°) to axis M), communicating via a gas path 26. A first stage of axial-like compressor blades 30 is provided extending from an inducer rotor 70, each blade having a leading edge 32 and a trailing edge 34. The leading edges 32 of the blades 30 are generally adjacent to the inlet 22. A second stage of centrifugal-like compressor vanes 40 (also known as impeller blades, or the like) is provided extending from an exducer rotor 72, each vane 40 having a leading edge 42 and a trailing edge 44. The trailing edges 44 of the impeller-like vanes 40 are generally adjacent to the outlet 24. In this example, there is no diffusion stage downstream of the centrifugal-like stage 40 within the hybrid compressor itself but rather, as shown in FIG. 1, a conventional diffuser 90, such as a pipe or vane diffuser 90 of the type typically provided in gas turbine engines to diffuse centrifugal compressors, is provided downstream of the outlet 24. The diffuser 90 may be any suitable diffusion stage, however, and may be located in any suitable location, including within the hybrid compressor if desired.

The compressor rotor 20 in this example is, as mentioned, in the form of an inducer 70 and exducer 72, with bolts 74 (or other means of joining together the inducer and exducer parts) joining the inducer and exducer together. A shroud 50 is disposed around the rotor 20 and cooperates with the inducer/exducer hubs to define the gas path 26. Extending inwardly from the shroud 50 in this example is a row of stationary stator vanes 60 between the first and second compression stages. A small space 62 is present between the compression stages 30/40 and the stationary vanes 60, as is generally typical between compression and diffusion stages.

The gas path 26 has a generally increasing inner hub radius, and a diminishing cross-sectional area (i.e. between hub and shroud), from the inlet 22 to the outlet 24. In FIG. 2, the rotor assembly has a somewhat regularly increasing inner hub radius. It should be noted that there is no requirement to have a "circular arc" shaped shroud (i.e. when viewed in 2D cross-section, as in FIG. 2), but rather the profile can be arbitrarily shaped to optimise the aerodynamic loading in the stator vane and/or reduce the Mach number (Mn) at the impeller tip, etc., in light of the teachings herein. The skilled reader will appreciate that the same may apply to the hub profiles.

The hybrid compressor may also include an apparatus for bleeding secondary air from an intermediate position within the compressor—it will be understood that intermediate bleed is not generally practical with conventional centrifugal impellers. In a first example, in the multiple rotor arrangement of FIG. 2, a bleed outlet 80 may be provided through the rotor, in this case through the exducer. In a second example shown in FIG. 3 and discussed further below, a bleed outlet 82 may instead/also be provided on the shroud housing 50. Bleed can be controlled using a controlling orifice (not shown) or any other suitable arrangement.

Referring now to FIG. 4, as will be understood by the skilled reader, the compressor blades 30 and impeller vanes 40 increase the air flow velocity as the blades turn, and the stator vanes 60 are be provided with an opposite orientation, or inclination, relative to the compressor axis (i.e. when viewed in a 2-D projection, as in FIG. 4), as compared to the blades 30 or vanes 40, in order to convert tangential velocity energy in the air into static pressure head energy prior to entry into the stage 40.

Thus, a hybrid compressor 20 is provided having a first, axial-like rotary compression stage, followed by a stationary stator vane diffusion stage, followed by a second, aerodynamically highly loaded centrifugal-like rotary compression stage, which thus yields the present example of an axial-centrifugal hybrid compressor. In use, air entering the inlet is accelerated and compressed by the axial-like stage 30, diffused and slowed by the stator vane row 60, and then further compressed and accelerated by the centrifugal-like stage 40, before exiting the compressor to be diffused downstream of the compressor by the diffuser 90, for delivery to the combustor 16 and, ultimately, to the turbine 18.

As mentioned above, the centrifugal-like stage may have a substantially radial exit, i.e. the exit angle of substantially 90° to the compressor axis M, while the axial-like stage will have a substantially axial inlet, i.e. the inlet angle is substantially parallel to the compressor axis M. The relative inlet and outlet angles of the axial-like stage and the centrifugal-like stage will now be discussed in more detail.

The skilled reader will appreciate that axial (or axial-like) compressor stages are considered to have low aerodynamic loadings, while mixed-flow and centrifugal stages are considered to have aerodynamic loadings, with centrifugal stages typically having higher blade loadings than mixed-flow stages. While some grey areas may exists when defining boundaries between them, a number of characteristics may be defined which distinguish a stage as either axial or centrifugal, or whether it has a low or high aerodynamic loading. For example, axial compression stages typically have a pressure ratio (PR) of less than about 2:1, whereas mixed-flow and centrifugal stages typically have pressure ratios greater than 2:1, and often well in excess of 2:1 (e.g. typically 4:1 or 5:1 or more typically even higher, such as 7:1 or higher, for a typical aero gas turbine centrifugal compressor). Therefore, it is to be understood that the axial-like stage 30 of the hybrid compressor of FIG. 2 may have a pressure ratio of less than 2:1 per stage, while the centrifugal-like stage 40 will have a pressure ratio in excess of 2:1, and perhaps well in excess of 2:1, such as 4:1 or 5:1, or higher, such as 7:1 or higher. The final stage of the hybrid compressor is thus highly loaded, as will be discussed further below. As is known in the art, the loading of a stage may be selected, within limits, through selection of blade shape, angle, number, radius change, gas path shape, etc. for a given rotor speed.

Some prior art has expressed aerodynamic blade loadings in terms of diffusion factor or ratio, and used this characteristic to distinguish between axial and centrifugal compressors. Typically, the concept of diffusion ratio applies only to axial flow compressors and is not easily applied to a centrifugal compressor. However, U.S. Pat. No. 4,428,715, the full contents of which are incorporated herein by reference, teaches an equation which it applies to centrifugal compressors to determine the diffusion loading on the centrifugal-like stage. U.S. Pat. No. 4,428,715 also teaches that, as the diffusion ratio increases, power losses rise at a relatively low rate until a diffusion ratio of about 0.55 is reached, after which losses increase much more sharply. U.S. Pat. No. 4,428,715 proposes to minimize losses by keeping each stage below a 0.55 diffusion factor limit. Similar teachings are found in other prior art, because the conventional wisdom is that in order to have low overall losses, losses within the compressor must be small everywhere. Hence, the diffusion factor, and thus pressure ratio, is taught to be limited in each stage. However, as discussed further below, the present inventors have found that although losses may increase sharply above some critical point (such as 0.55 in the example taught in U.S. Pat. No. 4,428,715), the effect of such losses on compressor performance can be tolerated as long as the losses within the compressor are commensurate with the pressure ratio. That is, a compressor having a stage with a high aerodynamic blade loadings may "tolerate" higher losses and yet still achieve a good efficiency. In general, the higher the aerodynamic loadings, the higher the losses tolerated.

Thus, in contrast to U.S. Pat. No. 4,428,715, in the present design the centrifugal-like stage preferably has a pressure ratio greater than 2:1 and thus would necessarily have a diffusion ratio above 0.55.

Radius change is another characteristic which may be used to distinguish between axial and centrifugal compressors. U.S. Pat. No. 4,428,715 sets a radius change (as defined in that reference) of 15% as a maximum for axial stages, and the skilled reader will agree that this limit is reasonably accepted in the art. Again, as with diffusion factor, U.S. Pat. No. 4,428, 715 and similar prior art teach minimizing losses in each stage, by minimizing the pressure ratio across the stage below 2:1, and hence minimizing radius change to less than 15%. Therefore, a 15% radius increase, or $r_{n+1}/r_n$ ratio of 1.15, may provide a practical upper limit to an axial-like stage, and thus also served as a practical lower limit to radius change for a centrifugal-like stage.

In the present hybrid compressor (e.g. as shown in FIG. 2), the centrifugal-like stage 40, by definition, has a radius change in excess of 15%. The radius change of the centrifugal-like stage 40 may typically be greater than the axial length of the stage, or in other words, have an angle of more than 45 degrees (i.e. the slope of the gas path, or the right triangle with the gas path axial length and radius change as its perpendicular sides).

Figure 3:
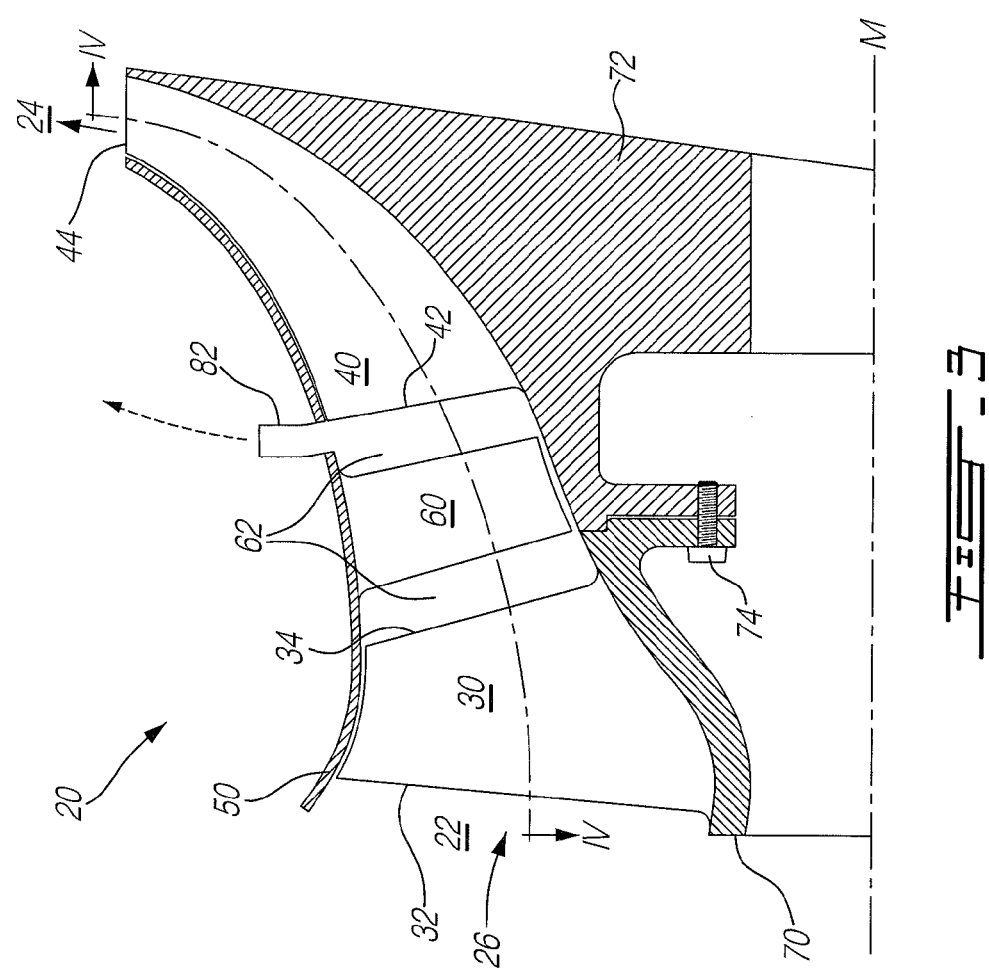
FIG. 3 is a schematic cross-sectional view of the upper half of another example of the compressor of Fig.

The hybrid compressor of FIG. 2 has a single axial-like stage 30, followed by a single centrifugal-like stage 40, with a single vane row 60 interposed in between. However, as shown in FIGS. 3 and 5, in which like elements are indicated with the same reference numerals described above, in other embodiments one or more stages of various designs may be provided upstream of the centrifugal-like stage 40. Specifically, FIG. 3 depicts a hybrid compressor in which the first stage 30 is a "mixed flow" stage, rather than an axial-like stage as in FIG. 2. The skilled reader will appreciate that a mixed flow stage may be defined as a stage having a pressure ratio of 2:1 and greater (and thus may have a diffusion ratio of greater than 0.55 and/or a radius increase in excess of 15%, i.e. in a similar fashion to a centrifugal stage). It will also be understood that, as between a mixed-flow stage and a centrifugal stage, the mixed-flow stage will tend to have lower pressure ratios and/or radius increases (e.g. a mixed stage may be in the range of, say 2:1 to 4:1 pressure ratio, whereas a pressure ratio of 5:1 or greater (e.g. 7:1 or higher, for example) may generally be considered a centrifugal stage, and so on). The skilled reader will also appreciate that the line between what is an axial, mixed-flow and centrifugal stage is not always clear and may be open to interpretation in various circumstances.

FIG. 5 depicts a hybrid compressor in which a plurality of axial-like stages 30 are provided upstream of the centrifugal-like stage 40, each followed by a respective stator vane row 60.

Since the addition of stages within the hybrid compressor increases the weight and complexity of the compressor, and may introduce operability issues such as surge margin problems and so on, it may be desirable to limit the number of stages within the hybrid compressor to 3 or less (i.e. two upstream stages and a final centrifugal-like stage mounted to the same rotor, e.g. as depicted in FIG. 5).

Therefore, the hybrid compressor of FIGS. 2,5 may have a low number, e.g. one or two, stages at the front of the compressor, followed by a single centrifugal-like stage 40 as the final stage. The upstream stage(s) may have small pressure ration (<2:1) (and may also have a radius change (<+15%) and/or low diffusion loading (<0.55)). The centrifugal-like stage, on the other hand, is a highly loaded stage which has a pressure ratio greater than 2:1 and may also have a radius increase of more than 15% and/or a diffusion ratio of more than 0.55. In practice, the centrifugal stage 40 will have a PR much greater than 2:1, such as a typical PR of 4:1, and more typically 7:1 or higher, as demonstrated in the Example below. The centrifugal-like stage may have supersonic inlet flow and/or a supersonic exit flow (Mn≧1.0), without detrimental effects on efficiency, especially if the final stage is relatively highly loaded, as mentioned. The skilled reader will appreciate that, in contrast, prior art such as U.S. Pat. No. 2,350,839 or 4,428,715 or French publication FR972751A which teach limiting internal airflow to subsonic speeds in and between compression stages by defining a larger number of compressions stages with lower diffusion loadings and/or smaller radius changes per stage, all with a goal of improving efficiency by keeping losses small everywhere. The inventors have found, however, that efficiency does not require losses to be small everywhere, and that the compressor stage(s) may have a supersonic flow, locally in the region of the centrifugal blades, without detrimental effects on efficiency, particularly if the stage has a relatively high pressure ratio. It has also been found that that providing keeping the number of stages low (i.e. three or less, and most preferably only two) and by providing diffusion between the stages, within a gas path of what would otherwise be an envelope similar to a purely centrifugal stage, may reduce the exit Mach number and increase the efficiency for a given total pressure ratio across the compressor, relative to a comparably sized purely centrifugal compressor. This may also provide an opportunity to achieve a given pressure ratio compressor at a reduced exit diameter, and therefore tip speed, as compared to a conventional centrifugal compressor.

Example

The hybrid compressor may be further understood with respect to the following example. A meanline analysis may be done for the compressors of FIG. 2 and FIG. 3, and compared with a reference impeller for a given mass flow, speed, etc. A leading edge position for the axial-like stages of FIGS. 2 and 3 is assumed identical to the reference compressor. If desired, for example to limit the Mach number within the compressor, some swirl may be retained at the exit of stator vanes 60. For the conditions, speed (Nc)=55,000 rpm, mass flow (Wc)=5.15 lb/sec, and the term (N*rt(W))=124,800, the results shown in Table 1 may be obtained. Thus, it may be seen that a hybrid compressor of the type depicted in FIG. 2 or 3 may offer improvement relative to the reference impeller (i.e. a conventional centrifugal compressor).

TABLE 1

|  | FIG. 2 Configuration | | | FIG. 3 Configuration | | | Reference Impeller | | |
| --- | --- | --- | --- | --- | --- | --- | --- | --- | --- |
|  | PR | Efficiency | Mn | PR | Efficiency | Mn | PR | Efficiency | Mn |
| Axial Stage | 1.71 | 0.862 | — | 1.66 | 0.870 | — | — | — | — |
| Cent. Stage | 5.27 | 0.819 | — | 6.04 | 0.829 | — | 8.00 | 0.796 | — |
| Total | 8.99 | 0.812 | 1.04 | 9.99 | 0.820 | — | 8.00 | 0.796 | 1.14 |

As has been discussed previously, U.S. Pat. No. 4,428,715 teaches providing a plurality of internal compression-diffusion stages, each with a low aerodynamic blade loading (i.e. diffusion ratio<0.55, and a radius change<15%). That is, each stage is sought to be kept as axial-like as possible, in order to maintain the beneficial efficiency aspects of the axial compressor. However, such an approach presents a number of practical problems, such as the fact that the relatively large number of stages necessarily leads to stages of small dimension, which may increase manufacturing problems, for example, by making it difficult to provide the required blade edge radii and tip clearances with sufficient precision to achieve the desired efficiency gains. As well, the small blade rows have low Reynolds numbers, which may presents problems relating to controlling surge margin and the operability of the compressor, particularly in an aircraft prime mover engine application, and even more particularly at altitude. The inventors have found that is generally more desirable to much fewer stages and higher pressure ratio per stage, as will be discussed further below.

As mentioned, prior art such as U.S. Pat. No. 2,350,839 or 4,428,715 attempts to provide efficiency through minimizing losses within each stage of the compressor, however as also mentioned the present inventors have found that a high efficiency compressor may have high internal losses (e.g. may tolerate supersonic internal air speeds), as long as the losses are commensurate with the pressure ratio of the stage under consideration. That is, a compressor with a stage having a high aerodynamic blade loading (i.e. a high pressure ratio) can tolerate higher losses and yet still achieve a good efficiency. Hence, presented herein is a compressor with significantly fewer stages than generally contemplated in prior art such as U.S. Pat. No. 4,428,715, and having a higher pressure ratio final stage than contemplated in other prior art, through application of the design criteria described herein.

In another embodiment, not depicted, the final stage 40 of the hybrid compressor may be a mixed-flow-like compressor stage, rather than a centrifugal-like stage. The final mixed-flow-like stage may have an exit angle of 30°, or greater, to the compressor axis M. Like the centrifugal-like final stage 40, the mixed-flow-like stage will have pressure ratio above 2:1, and perhaps 4:1 or greater. The mixed-flow-like stage radius change may be greater than 15%, and likewise the diffusion ratio for the mixed-flow-like stage may be greater than 0.55, as with a centrifugal stage. As mentioned above, the skilled reader will appreciate that the line delimiting a mixed-flow stage from centrifugal stage may sometimes be blurry—it will generally be understood that while both types have similar lower limits for pressure ratio, diffusion ratio and radius change, the lower ranges for these parameters will tend to be defined as a mixed-flow stage by those skilled in the art, while the higher ranges will generally be defined as centrifugal stages.

Referring to FIGS. 6-8, the engine 10 may employ a hybrid compressor stage 20 in addition to upstream (or downstream) compressor stages, comprising compressor rotors 14 and vane stages 15. For example, FIG. 6 depicts an engine 10 with a "1A+1H" compressor arrangement, having a conventional axial stage upstream of the hybrid compressor. The hybrid compressor 20, however, is provided on a single-piece rotor 71, rather than the inducer-exducer design described above. Similar to FIG. 6, FIG. 7 depicts an engine 10 with an "nA+1H" compressor arrangement. FIG. 8 depicts an engine 10 with a "1M+1H" arrangement, wherein a mixed-flow stage is provided upstream of a hybrid compressor.

In summary, the hybrid compressor combines the benefits of interrupted compression (i.e. intermediate diffusion) with the increasing radius of a conventional centrifugal stage to provide a lower exit velocity than is otherwise obtainable with a centrifugal stage alone. This, in turn, may result in greater compression than would be obtained from a centrifugal stage alone, or greater efficiency, or both.

This compressor design may yield a compact enough design that it is possible to replace an existing centrifugal stage with a present design occupying the same physical space or envelope, but which provides greater compression and efficiency. When comparing the present compressor with a conventional centrifugal impeller, if the present compressor is provided with the same impeller exit radius, the present compressor may provide similar efficiency but an improved pressure ratio. Alternately, by utilizing an impeller exit radius less than that of the conventional centrifugal stage, the present compressor may provide a similar pressure ratio but a greater efficiency. Intermediate results are also available. Thus, the result may be a compressor with less mass than a comparable centrifugal compressor, which may result in a lower cost and/or lighter weight compressor which may be lighter and easier to install engine, due to a smaller engine diameter The above description is meant to be exemplary only, and one skilled in the art will recognize that changes may be made to the embodiments described without departing from the scope of the inventions disclosed. For example, although a gas turbine turboshaft engine is illustrated and described, the hybrid compressor may be used with any suitable applications, such as other gas turbine engines, such as turboprop, turbofan, APU, etc., or in other compressor applications. The hybrid compressor 20 may be used to compress gases in other situations, such as compressors for supplying or receiving compressed air to/from pneumatic systems, or even be used as a suction device. Application may also be suitable in any other air-breathing device which includes a rotor, such a APU load compressors, turbochargers, radial turbines etc. The vanes 60 may be mounted to any suitable support, whether on the radial outer or inner side of the gas path, and the vanes may be fixed or variably positionable. Vanes 60 may be mounted to the shroud housing 50, or any other suitable support, in any suitable manner. The rotor disks 70, 72 may be integrated in a monolithic element or be an assembly of multiple elements, and can be made of any suitable material(s). Still other modifications will be apparent to those skilled in the art, in light of a review of this disclosure, and such modifications are intended to fall within the appended claims.

What is claimed is:

1. A gas compressor comprising a rotor rotatable about a compressor axis and cooperating with an annular compressor shroud to define a gas path extending from an upstream compressor inlet to a downstream compressor outlet, the inlet substantially parallel with the compressor axis and the outlet being non-parallel with the compressor axis, the rotor having first and second compression stages, the first compression stage comprising a circumferential array of blades extending from a rotor hub towards the shroud, the second compression stage downstream of the first and comprising a circumferential array of centrifugal-like compressor blades extending from the hub towards the shroud, each compression stage having a mean outlet radius greater than its mean inlet radius, the second compression stage having a pressure ratio exceeding 2:1, the compressor further comprising a diffusion stage interposed between said compressor stages, the diffusion stage comprising a circumferential array of vanes extending from the shroud toward the rotor hub, the diffusion stage vanes disposed between trailing edges of the first stage blades and leading edges of the second stage blades, diffusion stage vanes inclined oppositely to the blades of the compression stages to decrease tangential velocity of gas exiting the first compression stage.

2. The gas compressor of claim 1 wherein a pressure ratio across the second compression stage exceeds half of a total pressure ratio across the gas compressor.

3. The gas compressor of claim 1 wherein the first and second compression stages have pressure ratios such that, in use, supersonic free-stream gas flow speeds exist within the compressor.

4. The gas compressor of claim 1 wherein the gas path has a continuously diminishing cross-sectional area from the inlet to the outlet.

5. The gas compressor of claim 1 wherein the pressure ratio of the second compression stage exceeds 4:1.

6. The gas compressor of claim 5 wherein the first compression stage has a pressure ratio less than 2:1.

7. The gas compressor of claim 1 wherein the outlet is substantially orthogonally oriented with respect to the compressor axis.

8. The gas compressor of claim 1 wherein the first compression stage blade leading edges are immediately downstream of the inlet and the second compression stage blade trailing edges are immediately upstream of the outlet.

9. The gas compressor of claim 8 wherein one of a pipe diffuser and a vane diffuser is provided immediately downstream of the outlet.

10. The gas compressor of claim 1 wherein the diffusion stage vanes are fixed in position.

11. The gas compressor of claim 1 further comprising a third compression stage upstream of the first compression stage, and a second diffusion stage between the third compression stage and the first compression stage, and wherein the first and third compression stages each have a pressure ratio less than 2:1.

12. The gas compressor of claim 1 wherein the rotor comprises an inducer and an exducer, and wherein the first compression stage is on the inducer and the second compression stage is on the exducer.

13. The gas compressor of claim 1 further comprising a bleed outlet located between the first and second compressor stages.

14. The gas compressor of claim 13 wherein the bleed outlet extends radially through the rotor hub.

15. A gas compressor comprising a single axial-like compression-diffusion stage followed by a single centrifugal-like compression stage, the compressor having an axial inlet and a substantially radial outlet, the axial-like compression-diffusion stage including an a circumferential array of axial-like blades extending from a rotatable rotor of the compressor immediately downstream of the inlet and extending towards a shroud, the array of axial-like blades having a pressure ratio not greater than 2:1, the axial-like compression-diffusion stage further including a circumferential array of diffusion vanes located downstream of trailing edges of the axial-like blades and extending from the shroud toward the rotor, the centrifugal-like compression stage including a circumferential array of centrifugal-like compressor blades extending from the rotor towards the shroud, the array of centrifugal-like compressor blades having a pressure ratio exceeding 2:1, the array of centrifugal-like compressor blades having trailing edges immediately upstream of the outlet and leading edges downstream of trailing edges of the diffusion vane, the diffusion vanes inclined oppositely to the axial-like blades to decrease tangential velocity of gas exiting the axial-like blade array.

16. The gas compressor of claim 15 wherein the stages have respective radius changes, diffusion loadings and pressure ratios such that, in use, supersonic free-stream gas flow speeds occur within the compressor.

17. The gas compressor of claim 15 wherein the array of centrifugal-like compressor blades have a pressure ratio exceeding 4:1.

18. The gas compressor of claim 15 wherein the centrifugal-like compression stage is configured to provide at least half of the total pressure rise of the gas compressor.

19. A gas turbine engine comprising a compressor having a rotor and shroud defining a compressor gas path extending from a substantially axial inlet to a substantially radial outlet, the compressor including at least two compression stages and one diffusion stage between the inlet and outlet, the compression stages comprising respective circumferential arrays of blades extending from the rotor, the compression stages arranged serially relative to one another between the inlet and outlet, the diffusion stage comprising a circumferential array of vanes located serially between said compression stages, the diffusion stage vanes extending from the shroud toward the rotor, the compressor having at least one bleed outlet located through the shroud between the first and second compressor stages configured for bleeding from the gas path.

20. The gas turbine engine of claim 19 wherein the bleed outlet is disposed between the diffusion stage vane array and one of the array of blades.

\* \* \* \* \*